United States Patent [19]

Nakashima et al.

[11] Patent Number: 5,006,035

[45] Date of Patent: Apr. 9, 1991

[54] INDUSTRIAL ROBOT

[75] Inventors: Seiichiro Nakashima; Kenichi Toyoda, both of Hino; Nobutoshi Torii, Hachioji, all of Japan

[73] Assignee: Fanuc, Ltd., Yamanashi, Japan

[21] Appl. No.: 346,280

[22] Filed: Mar. 31, 1989

Related U.S. Application Data

[63] Continuation of Ser. No. 10,092, filed as PCT JP86/00208 on Apr. 25, 1986, published as WO86/06312 on Nov. 6, 1986, abandoned.

[30] Foreign Application Priority Data

Apr. 27, 1985 [JP] Japan ................................. 60-89907

[51] Int. Cl.[5] .............................................. B25J 9/06
[52] U.S. Cl. ...................................... 414/680; 901/15; 901/23; 371/66
[58] Field of Search ...................... 414/680, 735, 7.442, 414/744.3; 901/15, 23, 24, 2; 364/707; 371/66; 340/696; 250/237 G

[56] References Cited

U.S. PATENT DOCUMENTS

| 4,117,320 | 9/1978 | Tomlinson et al. | 250/237 G |
|---|---|---|---|
| 4,531,885 | 7/1985 | Molaug | 414/735 |
| 4,610,598 | 9/1986 | Hamada et al. | 901/21 X |
| 4,631,658 | 12/1986 | Easthill | 371/66 X |
| 4,636,138 | 1/1987 | Gorman | 414/735 |
| 4,654,829 | 3/1987 | Jiang et al. | 371/66 X |
| 4,699,563 | 10/1987 | Yokose | 901/15 X |

FOREIGN PATENT DOCUMENTS 54-126379 3/1979 Japan .
58-191982 12/1983 Japan .
59-5037 2/1984 Japan .

Primary Examiner—David A. Bucci
Assistant Examiner—Donald W. Underwood
Attorney, Agent, or Firm—Armstrong, Nikaido, Marmelstein, Kubovcik and Murray

[57] ABSTRACT

An industrial robot has a robot unit (10) comprising a fixed base (12) and movable robot components (16, 18, 20) operatively controlled by driving motors (M$\theta$, MW, MU, M$\alpha$, M$\beta$, M$\gamma$) provided with absolute position detecting encoders (EC$\theta$, ECW, ECU, EC$\alpha$, EC$\beta$, EC$\gamma$). The swivel body (16) among the movable robot components, mounted on the fixed base (12) is mounted, on its mount, with the driving motor (M$\theta$) for operatively controlling the same, and is mounted with and holds a battery (46) for supplying a backup voltage to the encoders of the driving motors (MW, MU, M$\alpha$, M$\beta$, M$\gamma$) for operatively controlling the movable robot components (18, 20). The battery is connected electrically by cables (48, 49) to the encoders (EC$\theta$, ECW, ECU, EC$\alpha$, EC$\beta$, EC$\gamma$).

3 Claims, 1 Drawing Sheet

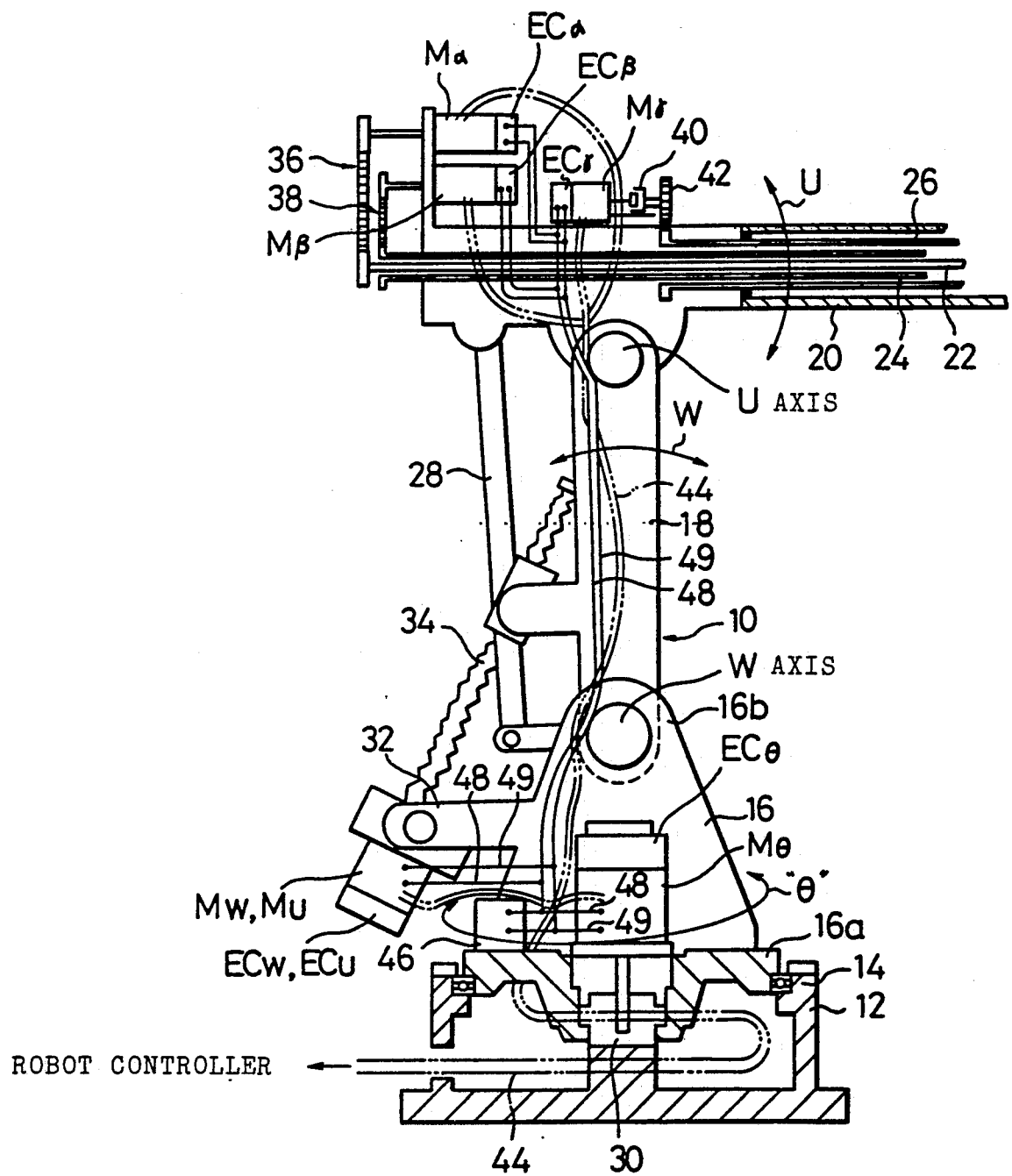

INDUSTRIAL ROBOT

This application is a continuation of application Ser. No. 010,092, filed as PCT JP86/00208 on Apr. 25, 1986, published as WO86/06312 on Nov. 6, 1986, now abandoned.

1. Technical Field

The present invention relates to an industrial robot and, more particularly, to a backup voltage supply battery mounting construction for an industrial robot equipped with a driving motor provided with an absolute position detecting encoder for controlling the respective actions of the movable robot components.

2. Background Art

An absolute position detecting encoder capable of detecting and storing the present angular position of a rotary shaft through the calculation and storage of the direction of rotation, the number of rotation, and angular position in one cycle of rotation of the rotary shaft is proposed in Japanese Unexamined Patent Publication No. 60-218,029 (corresponding U.S. patent application Ser. No. 696,560 filed on Jan. 30, 1985, and corresponding EPC Patent Application No. 85,101,295.5 filed on Feb. 7, 1985), and a driving motor incorporating such an absolute position detecting encoder and capable of detecting the present angular position of the output shaft thereof has been provided. The application of a driving motor provided with such an absolute position detecting encoder to control the actions of the movable robot components of an industrial robot enables the detection of the respective present position of the movable robot components interlocked with the output shaft of the driving motor, and storing the data of the present respective positions of the movable robot components. Accordingly, the robot control operation of a robot controller can be started quickly according to teaching data and can be very accurately carried out by reading the data of the present positions of the movable robot components. When, however, the driving motor provided with the above-mentioned absolute position detecting encoder is applied to an industrial robot, it is necessary to provide the industrial robot with a battery for supplying a backup voltage to prevent the extinguishment of the data stored in the absolute position detecting encoder, so that a backup voltage is applied to the absolute position detecting encoder when a feeder line for supplying an excitation voltage from the robot controller to the absolute position detecting encoder in the normal state is disconnected from the absolute position detecting encoder for robot maintenance work or when the absolute position detecting encoder is accidentally disconnected from the robot controller.

Accordingly, the battery must be always provided on the robot unit. But, since most recent industrial robots have a swivel body mounted on a fixed base disposed at the lowermost position of the robot unit, electric cables and pipes of the industrial robot are twisted as the swivel body is driven for swivel motion, which is liable to cause breakage of the electric cables and the pipes. In view of such an inconvenience, it is necessary to arrange the cable extending between the backup voltage supplying battery and each driving motor in such a way that the cable will not be twisted and accidentally broken by the swivel motion of the swivel body.

DISCLOSURE OF THE INVENTION

Accordingly, it is an object of the present invention to provide an industrial robot having a construction capable of meeting the foregoing conditions of the battery mounting construction.

In order to achieve the above-mentioned object, according to the present invention, a driving motor for operatively controlling the swivel body mounted on the fixed base of the robot unit of an industrial robot is mounted on the swivel body, and a backup voltage supplying battery for supplying backup voltage to the absolute position detecting encoder of the driving motor for the swivel body, and those of driving motors for operatively controlling the other movable components, is mounted and held on the swivel body to prevent twisting, and hence, breakage, of cables extending between the backup voltage supplying battery and the encoders.

BRIEF DESCRIPTION OF THE DRAWINGS

Other objects and features of the present invention will be apparent from the following description of an embodiment of the invention illustrated in the accompanying drawing, in which the single figure is a partially sectional front elevation of an industrial robot, in a preferred embodiment, according to the present invention, showing the constitution thereof.

BEST MODE FOR CARRYING OUT THE INVENTION

The single figure is a partially sectional front elevation of an industrial robot, more specifically, a six-axis type industrial robot by way of example, embodying the present invention. In the drawing, the robot unit 10 of the industrial robot has a hollow cylindrical fixed base 12, and a swivel body 16 is mounted for swivel motion about a longitudinal axis (axis $\theta$) on a bearing 14 on the fixed base 12. The swivel body 16 has a rotary base 16a, as illustrated in section. A first arm 18 is joined pivotally at the lower end thereof to an upper end 16b of the swivel body 16 so as to be swingable about a horizontal axis (axis W). A second arm 20 is joined pivotally to the upper end of the first arm 18 so as to be swingable in a vertical plane about a horizontal axis (axis U). An inner shaft 22, an intermediate shaft 24, and an outer shaft 26 are extended coaxially and rotatably within the second arm 20 to apply a wrist unit, not shown, attached to the free end of the second arm 20 for motions of three degrees of freedom of motion, namely, motions about an axis $\alpha$, an axis $\beta$, and an axis $\gamma$.

The respective basic constructions of the movable robot components of the robot unit 10 of the industrial robot, namely, the swivel body 16, the first arm 18, the second arm 20, the inner shaft 22, the intermediate shaft 24 and the outer shaft 26, movable about the six axes, namely, the axes $\theta$, W, U, $\alpha$, $\beta$ and $\gamma$, are substantially the same as those of the conventional six-axis cylindrical coordinates type robot. A balancing link 28 has one end pivotally joined to the first arm 18, and the other end pivotally joined to the second arm 20.

A driving motor $M\theta$ for driving the swivel body 16 is attached to the rotary base 16a of the swivel body 16 with the axis of the output shaft thereof in alignment with the axis. The output shaft of the driving motor $M\theta$ is interlocked with the fixed base 12 by a reduction gear 30, and thereby the swivel body 16 is driven for rotation on the bearing 14 about the axis $\theta$ by the counter action of the fixed base 12 when the driving motor $M\theta$ is actuated. Accordingly to the construction of the conventional robot unit, generally, the driving motor $M\theta$ is held at a fixed position on the fixed base 12 and the output shaft of the driving motor M$\theta$ is interlocked with the swivel body 16 by the reduction gear 30; consequently, the cable is twisted disadvantageously.

The driving motor M$\theta$ is provided with an absolute position detecting encoder EC$\theta$. A pair of two driving motors MW and MU for driving the first arm 18 and the second arm 20, respectively, are pivotally supported, one on the right-hand side and the other on the left-hand side, on an arm 32 projecting from the swivel body 16. The driving motors MW and MU are provided also with absolute position detecting encoders ECW and ECU, respectively. Similar to the conventional robot unit, a transmission mechanism for transmitting the rotative outputs of the driving motors MW and MU to drive the first arm 18 for swing motion about the axis W and to drive the second arm 20 for swing motion about the axis U is accommodated in a shaft tube 34, the first arm 18, and the second arm 20.

Driving motors M$\alpha$, M$\beta$, and M$\gamma$ for respectively driving the inner shaft 22, the intermediate shaft 24, and the outer shaft 26, are held on the second arm 20. The driving motor M$\alpha$ drives the inner shaft 22 rotatively through a belt-pulley mechanism 36; the driving motor M$\beta$ drives the intermediate shaft 24 rotatively through a belt-pulley mechanism 38; and the driving motor M$\gamma$ drives the outer shaft 26 rotatively through a reduction gear 40 and a gear train 42. Naturally, the driving motors M$\alpha$, M$\beta$, and M$\gamma$ are provided with absolute position detecting encoders EC$\alpha$, EC$\beta$, and EC$\gamma$, respectively, to detect and store the respective present positions of the inner shaft 22, the intermediate shaft 24, and the outer shaft 26 through the detection and storage of the respective present positions of the output shafts of the driving motors M$\alpha$, M$\beta$, and M$\gamma$, respectively.

Electric power and excitation voltage are always supplied to the driving motors M$\theta$, MW, MU, M$\alpha$, M$\beta$, and M$\gamma$, and the encoders EC$\theta$, ECW, ECU, EC$\alpha$, EC$\beta$, and EC$\gamma$ of the same, through an electric cable 44 electrically interconnecting a robot controller, not shown, and the robot unit 10. Although the cable 44 has a sufficient length in reserve within the fixed base 12, the cable 44 is twisted around the axis $\theta$ as the swivel body 16 is driven for swivel motion relative to the fixed base 12, and hence it is impossible to avoid the breakage of the cable 44 during the operation of the industrial robot for an extended period of time. Accordingly, cables for supplying the backup voltage to those encoders including the encoder EC$\theta$ should not be included in the cable 44. According to the present invention, a backup voltage supply battery 46 is mounted on the rotary base 16a of the swivel body 16. Accordingly, the battery 46 is not rotated relative to the movable robot components including the swivel body 16, the first arm 18, and the second arm 20, when the swivel body 16 swivels about the axis $\theta$. Accordingly, the breakage of the backup voltage supply cables 48 and 49 extended from the battery 46 to the respective encoders EC$\theta$, ECW, ECU, EC$\alpha$, EC$\beta$, and EC$\gamma$ of the driving motors M$\theta$, MW, MU, M$\alpha$, M$\beta$, and M$\gamma$ attributable to the twist of the same is surely obviated. Since the extension and contraction of the cables 48 and 49 resulting from the swing motion of the first arm 18 and the swing motion of the second arm 20 in a vertical plane are avoidable by extending the cables 48 and 49 beforehand to a sufficient length, the breakage of the cables 48 and 49 attributable to the extension and contraction of the same is prevented. The battery 46 is a dry element battery available in the market, and is contained in a battery box. The battery 46 is replaceable. Backup voltage supply cables are extended from terminals provided on the battery case to the encoders EC$\theta$, ECW, ECU, EC$\alpha$, EC$\beta$, and EC$\gamma$. The encoder of U.S. Pat. No. 4,604,521, dated Aug. 5, 1986, discloses encoders suitable for such use.

As apparent from the above description, according to the present invention, the industrial robot having the driving motors equipped with the absolute position detecting encoders, respectively, for operatively controlling the movable robot components thereof, is provided, on the swivel body thereof, with the backup voltage supply battery for preventing the extinguishment of the data stored in the encoders, and the driving motor for driving the swivel body, and hence the battery swivels together with the swivel body about the axis of swivel motion of the swivel body to avoid rotation relative to the other movable robot components. Accordingly, breakage of the cables for supplying the backup voltage from the battery to the encoders, attributable to the twist of the same is avoided, and hence the respective present positions of the movable robot components can be safely detected by and stored in the absolute position detecting encoders. The foregoing advantages are remarkably effective in securing safety, because it is possible for the cables to be twisted and broken at some part when the battery is mounted on the robot unit in the conventional robot mechanism, in which the driving motors are attached to and held on the fixed base.

We claim:

1. In an industrial robot having a robot unit comprising a fixed base and movable robot components, said movable robot components including a swivel body having an outerface and mounted on the fixed base so as to swivel about a longitudinal axis, a first robot arm pivotally joined to one end of the swivel body, and a second robot arm pivotally joined to one end of the first robot arm and provided with a robot wrist unit, characterized in that a first driving motor is mounted on said swivel body for swiveling said swivel body on said fixed base, second driving motors are mounted on said swivel body for pivoting said first robot arm on said swivel body and for pivoting said second robot arm on said first robot arm, respectively, and third drive motors are mounted on said second robot arm for driving said wrist unit, each of said motors of said first, second and third motors each having mounted on each, respective, motor an absolute position detecting encoder, and a battery mounted on said outerface of said swivel body and connected to each said encoder of each said second and third driving motors for supplying backup voltage to said encoders of said second and third drive motors for driving said movable robot components, other than said swivel body, mounted on said swivel body.

2. In an industrial robot according to claim 1, wherein said driving motor for operatively controlling said swivel body is mounted with the axis of the output shaft thereof in alignment with the axis of the swivel motion of the swivel body, and said battery for supplying backup voltage is disposed beside said swivel body driving motor.

3. In an industrial robot as recited in claim 1, wherein said battery is replaceably contained in a battery case.

* * * * *